3,245,937
AQUEOUS COATING COMPOSITION COMPRISING A TERPOLYMER AND AN ADDITIVE
Richard H. Wagner, Rochester, N.Y., assignor to Eastman Kodak Company, Rochester, N.Y., a corporation of New Jersey
No Drawing. Original application Feb. 6, 1961, Ser. No. 87,120. Divided and this application Feb. 25, 1963, Ser. No. 260,908
9 Claims. (Cl. 260—29.6)

This application is a division of application Serial No. 87,120, filed February 6, 1961, now abandoned.

This invention concerns the adhering of various types of layers to polyester sheet or film surfaces. More particularly, this invention relates to improving the application of sub coatings and other similar coatings onto polyester film base whereby a film base is obtained which will carry gelatin layers and the like rendering the base particularly suitable for photographic purposes.

Polyester sheets and films and particularly such products made from the polymer known as polyethylene terephthalate are well-known commercial materials which possess a number of advantages for many uses. However, the use of such polyester materials in the photographic industry and in certain other industries has presented some problems because of the difficulty of suitably adhering various other layers to such type polyester bases. The problem of adhering layers to such type surfaces has been discussed to a certain extent in my co-workers' recently issued Patent 2,943,937 and procedure set forth on treating such polyester surfaces in certain ways in order that layers may be better adhered thereto. In companion copending application Nadeau et al. Serial No. 15,542, my co-workers have described another approach to the problem of adhering layers to polyester surfaces which involves incorporating certain addenda in a subbing layer applied to the base. The present invention is along somewhat similar lines to the copending application just referred to in that in the present invention certain materials are incorporated in the sub coating layer. However, by the present invention additional advantages may be obtained.

It is believed apparent, therefore, that the development of further procedures for adhering various layers to polyester surfaces represents a highly desirable result. After extensive investigation we have discovered certain procedures as will be described in detail hereinafter which are thought to minimize to a substantial extent the aforesaid problems of adhesion.

This invention has for one object to provide procedure for adhering certain layers to polyester films and sheets. A particular object is to provide a polyester photographic film base having adhered thereto certain layers in order to provide a base that is better adapted to receive photographic coatings. Another object is to provide a polymeric coating composition particularly useful for coating onto the surface of polyester films and sheets. Another object is to provide specially prepared polymer compositions having certain viscosity properties which render the polymer compositions particularly useful for compounding into the aforementioned coating compositions. Another object is to provide a method of manufacturing such polymer compositions. Other objects will appear hereinafter.

In the broader aspects of our invention we have found that if a certain addendum is incorporated in the coating composition applied to the polyester surface, that said coating may be caused to better adhere. The polyester materials may be in an untreated or treated condition. In other words, the present invention may be applied to the treated polyester surfaces as described in my co-workers' Patent 2,943,937 already referred to. For best results, we prefer to use a coating composition consisting of the addenda of the present invention and also a specially prepared terpolymer latex. The terpolymer to be prepared as described in further detail hereinafter has an intrinsic viscosity of 1.0 or greater when isolated, dried and dissolved to a .25% solution in cyclohexanone.

We have found that better adhesion of polymeric coatings onto such polyester surfaces may be obtained by incorporating therein an addendum of the following composition.

| Component | Preferred, percent by weight | Range, percent by weight |
|---|---|---|
| 1,2,4-trichlorobenzene | 33 | 33–70 |
| Biphenyl | 14 | 0–14 |
| Monochlorobenzene | 0 | 0–35 |
| Orthophenylphenol | 11.5 | 0–35 |
| n-Butyl Cellosolve | 15 | 10–15 |
| Surfactant | 6.3 | 5–6.3 |
| Water | 20 | 15–20 |

For convenience of reference, we will refer to the above addendum of several components as Additive T.

The polymer used in my coating composition would in general comprise vinylidene chloride, an acrylate and an unsaturated acid exemplified by itaconic acid. Inasmuch as such polymer compositions are described in companion Patent 2,943,937, extended description thereof herein is unnecessary. However, in general, the polymers which have previously been used have had an intrinsic viscosity of less than one. In accordance with the preferred operation of the present invention I have found that better adhesion may be obtained utilizing the T additive of the present invention in combination with a polymer having an intrinsic viscosity of one or greater.

Such polymers having an inherent viscosity in cyclohexanone of one or greater may be produced by reacting the monomers together in the same general way as presently practiced to produce the terpolymers from the monomers. However, I have found that if the following conditions are practiced in preparing the polymer that a polymer having this increased viscosity may be obtained.

(1) I would use in the polymerization a particular surfactant as sodium alkaryl sulfonate.

(2) The polymerization would preferably be carried out in a sealed reaction system.

(3) A lowered initial concentration of monomers is used so as to result in turn in a reduced solids content in the final polymerized composition.

(4) In particular a controlled polymerization temperature below 40° C. and preferably below 36° C. is maintained.

Of the above-mentioned conditions, maintaining the temperature control is of the greatest importance to obtain my preferred terpolymer having a viscosity of one or greater.

In further detail and as a simple illustration, the monomers vinylidene chloride, methyl acrylate and itaconic acid in proportions of about 84, 14 and 2% by weight of the mixture would be placed in a sealed reaction apparatus. About 6 to 8% by weight of surfactant based on the total weight as, for example, the alkali alkaryl sulfonate mentioned above would be included. Thermostatic control on the reactor is set at 40° C. or below. A relatively long induction period of 5 to 8 hours may elapse before a temperature rise occurs. Upon such temperature rise, the reaction is controlled by stirring and cooling so that the temperature preferably does not exceed 36° C. Usually for about two hours with stirring the reaction in the sealed reactor may be continued. The polymer product resulting from such controlled manufacture showed an inherent viscosity in cyclohexanone at 25° C. of greater than one. Further information concerning other polymers which may be produced having a viscosity greater than one may be obtained from companion application Serial No. 765,345 in the name of Ley and Fowler.

By incorporating the T additive of the present invention into suitable polymeric coating compositions, a composition is obtained which suitably adheres as will be set forth hereinafter. However, in addition it has been found that the present invention provides an added advantage. Prior to the present invention, it was usually desirable to process the polyester base to a density of greater than 1.3 or 1.4 after the coating composition was applied thereto. Such subsequent high density processing may tend to produce a film base that is somewhat buckled and distorted. In other words, there is a tendency to introduced non-planar conditions. In the present invention after the sub coating composition as described herein is applied to the polyester surface, while various processing steps for increasing density may be applied, such may be below the value of 1.4 referred to.

A further understanding of our invention will be had from a consideration of the following examples which are set forth for illustrating certain preferred embodiments.

*Example I*

The copolymer used for the coating was prepared by emulsion polymerization of 7.4 parts of methyl acrylate, 42 parts of vinylidene chloride and 1 part of itaconic acid. The procedure used was that disclosed in companion application Serial No. 765,345. This resultant copolymer has a viscosity of 1.0 or greater when measured by the previously mentioned technique.

The coating composition was made up by taking an aqueous dispersion of the polymer and adding thereto small amounts of additives ranging from 0.25% to 3% of the polymer weight. That is, the T-additives of the present invention which was included always contained as a minimum 1,2,4-trichlorobenzene, orthophenyl phenol, biphenyl and monochlorobenzene in the amounts described above.

The resultant aqueous dispersion of the polymer with additive was coated onto the surface of amorphous, unoriented polyester (polyethylene terephthalate) film base by roller coating and dried. The coated film base was then stretched 200% in length and in width and heated while restrained to increase its density. However, in accordance with the present invention such processing was not carried out to an extent that increased the density beyond 1.390.

The coated film base was overcoated with an aqueous gelatin subbing layer and dried. The adhesion of a silver halide gelatin photographic emulsion to film base sample prepared in this manner is shown in the following table.

| Sub Composition | Adhesion Tests [1] | |
|---|---|---|
| | Dry | Wet |
| 7% Copolymer | 7 | 0 |
| 7% Copolymer+0.25% Additive T | 7 | 7 |
| 7% Copolymer+0.50% Additive T | 7 | 7 |
| 7% Copolymer+1.0% Additive T | 7 | 7 |
| 7% Copolymer+3.0% Additive T | 3 | 1 |
| 20% Copolymer+0.25% Additive T | 3 | 1 |
| 20% Copolymer+3.0% Additive T | 1 | 0 |

[1] Adhesion values: 0=Excellent; 1=Very Good; 2=Good; 3=Fair; 7=Poor.

In the wet adhesion test the film is processed in developer, stop bath, fix and wash. The photographic emulsion of the wet film is then scratched through to the base and the edges of the scratch rubbed vigorously with the fingers in an attempt to rub the wet emulsion off the film base. The degree of resistance of the emulsion to this treatment is its wet adhesion.

In the dry adhesion test the film is processed through developer, stop bath, fix and wash. The film is dried and conditioned to 70° F. 50 R.H. Then transparent Scotch tape is used in an attempt to pull the emulsion from the film base in areas where the emulsion has been cut or scribed. The amount of emulsion removed by the tape measures its dry adhesion.

*Example II*

The copolymer used was prepared without using the controls specified in companion Serial No. 765,345. Its viscosity was lower than one.

Coating compositions made with this material had poorer adhesion properties, particularly after the film had been stored at higher temperatures or lower humidities.

*Example III*

A coating as described in Example I was prepared using a 7% latex of the same polymer having an inherent viscosity of greater than 1. Additives were incorporated as follows at a concentration level of 3% based on the weight of the latex:

| Sub Composition | Adhesion Tests [1] | |
|---|---|---|
| | Dry | Wet |
| 7% Copolymer | 7 | 0 |
| 7% Copolymer+3.0% Additive A | 2 | 0 |
| 7% Copolymer+3.0% Additive B | 2 | 0 |
| 7% Copolymer+3.0% Additive C | 2 | 0 |
| 7% Copolymer+3.0% Additive D | 1 | 0 |

[1] Adhesion values: 0=Excellent; 1=Very good; 2=Good; 3=Fair; 7=Poor.

In terms of weight percentages, the compositions of the above additives are as follows:

| Component | Additive | | | |
|---|---|---|---|---|
| | A | B | C | D |
| 1,2,4-trichlorobenzene | 35 | 70 | 35 | 33 |
| o-Phenyl phenol | 35 | 0 | 0 | 11.5 |
| Monochlorobenzene | 0 | 0 | 35 | 0 |
| Biphenyl | 0 | 0 | 0 | 14 |
| n-Butyl Cellosolve | 10 | 10 | 10 | 15 |
| Triton 770 (surfactant) | 5 | 5 | 5 | 6.3 |
| Water | 15 | 15 | 15 | 20 |

From the foregoing examples it can be seen that the T additive of the present invention is most effective when added in the amount of from .25% to 3% to a polymeric coating composition which contains preferably 7% solids but the solids content may be within the general range of 2 to 20%. The use of the T additive of the present invention appears to lead to sub layers on the polyester support which not only suitably adhere thereto, but have a better appearance and are less tacky than comparable prior art subcoatings.

Although for preferred operations I would employ a T additive containing all of the ingredients described above, I have found that an additive comprised of only the four components 1,2,4-trichlorobenzene, n-butyl Cellosolve, biphenyl and orthophenylphenol is satisfactory. While biphenyl alone exhibits some beneficial effect in general the effect of the individual components is insufficient for the purposes of the present invention. In other words, a mixture of the components of the T additive appears to be required to produce suitable adhesion results. In some instances the orthophenylphenol may be replaced in part by benzyl alcohol.

While my invention has been described with particular reference to the application of a terpolymer coating comprised of vinylidene chloride, an alkyl acrylate and an unsaturated acid, other polymeric coating compositions such as disclosed in companion Patent 2,943,937 may be used.

It is believed apparent from the foregoing that I have provided a new and unobvious procedure for better adhering polymeric coatings onto polyester surfaces which present difficulties respecting such adherence. In addition, I have provided a disclosure concerning polymeric compositions which not only better adhere with or without additives, but which are particularly useful for combining with the additives of the present invention, such terpolymers being in particular those that have viscosities as described above.

The above description and examples are illustrative of the invention and not in limitation thereof.

I claim:

1. An aqueous coating composition comprising (1) about 2 to about 20%, by weight, of a terpolymer of an alkyl acrylate, vinylidene chloride and an unsaturated carboxylic acid, and (2) about .25 to about 3%, by weight, based on terpolymer, of an additive containing (a) about 33 to about 70%, by weight, 1,2,4-trichlorobenzene, (b) 0 to about 14%, by weight, of biphenyl, (c) 0 to about 35%, by weight, of monochlorobenzene, and (d) 0 to about 35%, by weight, of orthophenylphenol.

2. The coating composition according to claim 1 wherein the terpolymer is a terpolymer of methyl acrylate, vinylidene chloride and itaconic acid.

3. The coating composition according to claim 1 wherein the terpolymer is present in a concentration of about 20%, by weight.

4. The coating composition according to claim 1 wherein the terpolymer has a viscosity of at least one in cyclohexanone at a temperature of about 25° C.

5. In a method for providing a highly adherent layer of a terpolymer of an alkyl acrylate, vinylidene chloride and an unsaturated carboxylic acid to at least one surface of a polyester film, the improvement which comprises coating said polyester film with an aqueous coating composition comprising (1) about 2 to about 20%, by weight, of said terpolymer and (2) about .25 to about 3%, by weight, based on terpolymer, of an additive containing (a) about 33 to about 70%, by weight, 1,2,4-trichlorobenzene, (b) 0 to about 14%, by weight, of biphenyl, (c) 0 to about 35%, by weight, of monochlorobenzene, and (d) 0 to about 35%, by weight, of orthophenylphenol.

6. In a method for providing a highly adherent layer of a terpolymer of methyl acrylate, vinylidene chloride and itaconic acid to at least one surface of a polyester film, the improvement which comprises coating said polyester film with an aqueous coating composition comprising (1) about 2 to about 20%, by weight, of said terpolymer and (2) about .25 to about 3%, by weight, based on terpolymer, of an additive containing (a) about 33 to about 70%, by weight, 1,2,4-trichlorobenzene, (b) 0 to about 14%, by weight, of biphenyl, (c) 0 to about 35%, by weight, of monochlorobenzene, and (d) 0 to about 35%, by weight, of orthophenylphenol.

7. A polyester film which has been coated on at least one surface with an aqueous coating composition comprising (1) about 2 to about 20%, by weight, of a terpolymer of an alkyl acrylate, vinylidene chloride and an unsaturated carboxylic acid, and (2) about .25 to about 3%, by weight, based on terpolymer, of an additive containing (a) about 33 to about 70%, by weight, 1,2,4-trichlorobenzene, (b) 0 to about 14%, by weight, of biphenyl, (c) 0 to about 35%, by weight, of monochlorobenzene, and (d) 0 to about 35%, by weight, of orthophenylphenol.

8. A photographic element comprising at least one silver halide emulsion layer superimposed upon a polyester film support which has been coated on at least one surface with an aqueous coating composition comprising (1) about 2 to about 20%, by weight, of a terpolymer of an alkyl acrylate, vinylidene chloride and an unsaturated carboxylic acid, and (2) about .25 to about 3%, by weight, based on terpolymer, of an additive containing (a) about 33 to about 70%, by weight, 1,2,4-trichlorobenzene, (b) 0 to about 14%, by weight, or biphenyl, (c) 0 to about 35%, by weight, of monochlorobenzene, and (d) 0 to about 35%, by weight, or orthophenylphenol.

9. A photographic element comprising at least one silver halide emulsion layer superimposed upon a polyethylene terephthalate film support which has been coated on at least one surface with an aqueous coating composition comprising (1) about 2 to about 20%, by weight, of a terpolymer of methyl acrylate, vinylidene chloride and itaconic acid, and (2) about .25 to about 3%, by weight, based on terpolymer, of an additive containing (a) about 33 to about 70%, by weight, 1,2,4-trichlorobenzene, (b) 0 to about 14%, by weight, of biphenyl, (c) 0 to about 35%, by weight, of monochlorobenzene, and (d) 0 to about 35%, by weight, of orthophenylphenol.

References Cited by the Examiner

UNITED STATES PATENTS 2,622,056  12/1952  De Coudres et al. ---- 260—33.8
2,943,937  7/1960  Nadeau et al. ------ 117—138.8

MURRAY TILLMAN, *Primary Examiner.*

SAMUEL H. BLECH, WILBERT J. BRIGGS, SR.,
*Assistant Examiners.*